US007904715B2

(12) United States Patent
Mizikovsky

(10) Patent No.: US 7,904,715 B2
(45) Date of Patent: Mar. 8, 2011

(54) METHOD FOR AUTHENTICATING DUAL-MODE ACCESS TERMINALS

(75) Inventor: Semyon B. Mizikovsky, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2015 days.

(21) Appl. No.: 10/822,220

(22) Filed: Apr. 9, 2004

(65) Prior Publication Data

US 2005/0228992 A1 Oct. 13, 2005

(51) Int. Cl.
*H04L 9/32* (2006.01)

(52) U.S. Cl. .......... 713/168; 713/150; 713/170; 713/171

(58) Field of Classification Search .................. 713/150, 713/168

See application file for complete search history.

(56) References Cited

U.S. PATENT DOCUMENTS 3,226,682 A * 12/1965 Levinthal et al. ............ 235/454
2005/0078824 A1 * 4/2005 Malinen et al. ............... 380/247
2005/0228992 A1 * 10/2005 Mizikovsky ................. 713/168
2005/0251681 A1 * 11/2005 Robles et al. ................ 713/172

OTHER PUBLICATIONS

Quick, Frank "Common Security Algorithms"—3rd Generations Partnership Project 2. Qualcomm Incorporated, Jul. 10, 2002.*

* cited by examiner

*Primary Examiner* — Pramila Parthasarathy
(74) *Attorney, Agent, or Firm* — Williams, Morgan & Amerson, P.C.

(57) ABSTRACT

A method is provided for operating a dual-mode access terminal such that a CAVE based authentication process may be used in both an IS-2000 and an HRPD mode of operation. Generally, the access terminal receives a CHAP challenge from an access network, and then derives a RAND challenge based on at least a portion of the CHAP challenge. The CAVE based authentication process is then performed using the RAND challenge to produce a SMEKEY and a PLCM. Thereafter a secret CHAP key is derived from the SMEKEY and PLCM and provided to the access network for purposes of authenticating the access terminal in the HRPD mode of operation.

10 Claims, 4 Drawing Sheets

METHOD FOR AUTHENTICATING DUAL-MODE ACCESS TERMINALS

BACKGROUND OF THE INVENTION

1. Field of the Invention

This invention relates generally to telecommunications, and, more particularly, to wireless communications.

2. Description of the Related Art

Cellular communication systems have increasingly become popular over the last several years. A number of complementary standards or protocols, such as IS-2000 or HRPD, have come into fairly common usage. These standards have been used to transmit voice signals, low speed data, and high-speed data. Accordingly, it has been useful for access terminals to be developed that are capable of operating using two (or more) standards. These access terminals are commonly referred to as dual-mode, and typically include substantially separate control systems for each standard.

Advantages in converging the standards into a common mobile terminal may exist. However, these integration aspirations have given rise to security issues, such as determining an efficient and secure manner of authenticating an access terminal under each standard. Typically, the authentication processes for the separate standards are substantially dissimilar and employ substantially different hardware and/or software to perform the authentication process for each standard.

The present invention is directed to addressing one or more of the problems set forth above.

SUMMARY OF THE INVENTION

In one embodiment of the present invention, a method is provided. The method comprises receiving a first challenge associated with a first authentication process, and deriving a second challenge associated with a second authentication process based on at least a portion of the first challenge. The second authentication process is performed using the derived second challenge to produce at least one authentication parameter therefrom. A secret key associated with the first authentication process is derived based on the at least one authentication parameter.

In another embodiment of the present invention, a method is provided. The method comprises receiving a CHAP challenge, and deriving a RAND challenge based on at least a portion of the CHAP challenge. An authentication is performed using the RAND challenge to produce a SMEKEY and a PLCM. A secret CHAP key is derived based on the SMEKEY and PLCM.

BRIEF DESCRIPTION OF THE DRAWINGS

The invention may be understood by reference to the following description taken in conjunction with the accompanying drawings, in which like reference numerals identify like elements, and in which.

Figure 1:
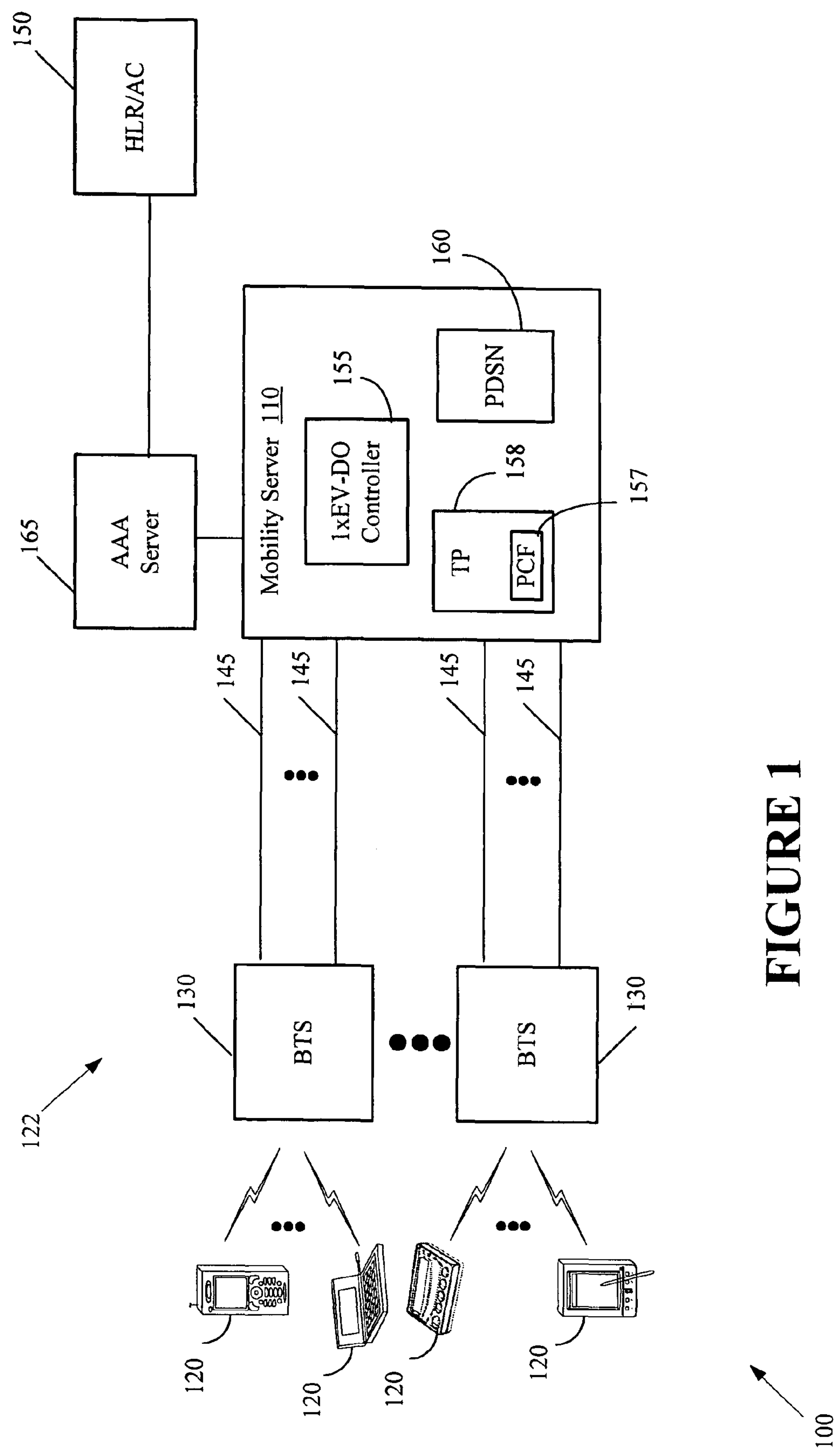
FIG. 1 is a block diagram illustration of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. The communications system 100 of FIG. 1 allows mobile access terminals 120 to communicate with an access network 122 using two different modes of operation: 1) voice and relatively low speed data transmissions (e.g., IS-2000); and 2) high speed data transmissions (e.g., high rate packet data (HRPD)). Although not so limited, in the illustrated embodiment, the communications system 100 is a Code Division Multiple Access (CDMA) system. CDMA is a "spread spectrum" technology, allowing many users to occupy the same time and frequency allocations in a given band/space. As its name implies, CDMA assigns unique codes to each communication to differentiate it from others in the same spectrum. CDMA includes second generation (2G) and third generation (3G) services. 2G CDMA standards are commonly known as CDMAONE and include the TIA/EIA/IS-95 standard. Two dominant standards for 3G services include IS-2000 and wideband CDMA (CDMA2000 represents a family of technologies that includes IS-2000 also known as 3G1x and 1xEV-DV, and HRPD, also known as 1xEV-DO). For illustrative purposes, it is herein assumed that the communications system 100 of FIG. 1 is a CDMA2000 network, although one or more embodiments of the present invention may be applied to other cellular schemes, including, but not limited to, OFDMA, TDMA, GSM, and ASM.

For purposes of illustration, one embodiment of the instant invention is described herein in the context of a 1xEV-DO system, although it should be understood that the present invention may be applicable to other systems that support data and/or voice communication. The access network 122 includes a mobility server 110 that allows one or more access terminals 120 to communicate with a data network (not shown), such as the Internet, through one or more base stations (BTS) 130. The access terminal 120 may include one of a variety of devices, including cellular phones, personal digital assistants (PDAs), laptops, digital pagers, wireless cards, and any other device capable of accessing the data network through the BTS 130. In the illustrated embodiment, the access terminals 120 are configured to operate as dual-mode devices, capable of communicating in two different modes of operation, such as IS-2000 and HRPD.

In one embodiment, each BTS 130 may be coupled to the mobility server 110 by one or more connections 145, such as T1/EI lines or circuits, ATM circuits, cables, and optical digital subscriber lines (DSLs).

The mobility server 110 of FIG. 1 generally provides replication, communications, runtime, and system management services. The mobility server 110, in the illustrated embodiment, includes a 1xEV-DO controller 155, and a packet control function (PCF) module 157 embedded in a traffic processor (TP) module 158. The 1xEV-DO controller 155 supports 1xEV-DO service in the communications system 100 of FIG. 1, and the traffic processor module 158 handles calling processing functions, such as setting and terminating a call path. The traffic processor module 158, in one embodiment, is capable of determining a data transmission rate on the forward and/or reverse link for each user (or access terminal 120) and for each sector supported by the BTS 130. The PCF module 157, in one embodiment, buffers data received from a packet data service node (PDSN) 160 (described below), as well as maintains data during a dormant state. The PCF module 157 may support communications through an Open R-P (A10-A11) interface, where the A10 interface may be utilized for packet traffic and the A11 interface for signaling. Because the Open R-P interface is well-known to those skilled in the art, it is not described in detail herein.

In the illustrated embodiment, the PDSN 160 is coupled with the mobility server 110, and may be considered as the functional part of the mobility server 110 for the purpose of this application. Generally, it may be deployed as a separate network entity communicating with the 1xEV-DO Controller 155 through an open R-P interface, or be integrated with other functional entities of the mobility server 110. The mobility server 110 is coupled with an Authentication, Authorization, and Accounting (AAA) server 165. Generally, the BTS 130, the mobility server 110 and the AAA server 165 form an HRPD network. As discussed more fully below in conjunction with FIGS. 3 and 4, the AAA server 165 is generally responsible for authorizing the communication session after authenticating the user. Generally, the AAA server 165 validates security information provided by the user and forwarded by the mobility server 110.

It should be understood that the configuration of the access network 122 of FIG. 1 is exemplary in nature, and that fewer or additional components may be employed in other embodiments of the access network 122. For example, in one embodiment, the access network 122 may include a network management system (not shown) that provides operation, administration, maintenance, and provisioning functions for a 1xEV-DO network. Additionally, the access network 122 may include one or more multiplexers (not shown) or routers (not shown) connected between the BTS 130 and the mobility server 110 for performing protocol translations. Similarly, other components may be added or removed from the communications access network 122 of FIG. 1 without deviating from the spirit and scope of the invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

A home location register/authentication center (HLR/AC) 150 is generally responsible for authenticating access terminals 120 that are operating in the IS-2000 mode of operation. As described in greater detail below, in accordance with one or more embodiments of the present invention, the mobile terminals 120 that are using IS-2000 protocol are authenticated based on security value(s) provided by the HLR/AC 150. The HLR/AC 150 is also coupled to the AAA server 165, and, as is discussed in greater detail below in conjunction with FIGS. 3 and 4, the HLR/AC 150 exchanges information with the AAA Server 165 during authentication of an access terminal that is operating in the HRPD mode of operation.

Figure 2:
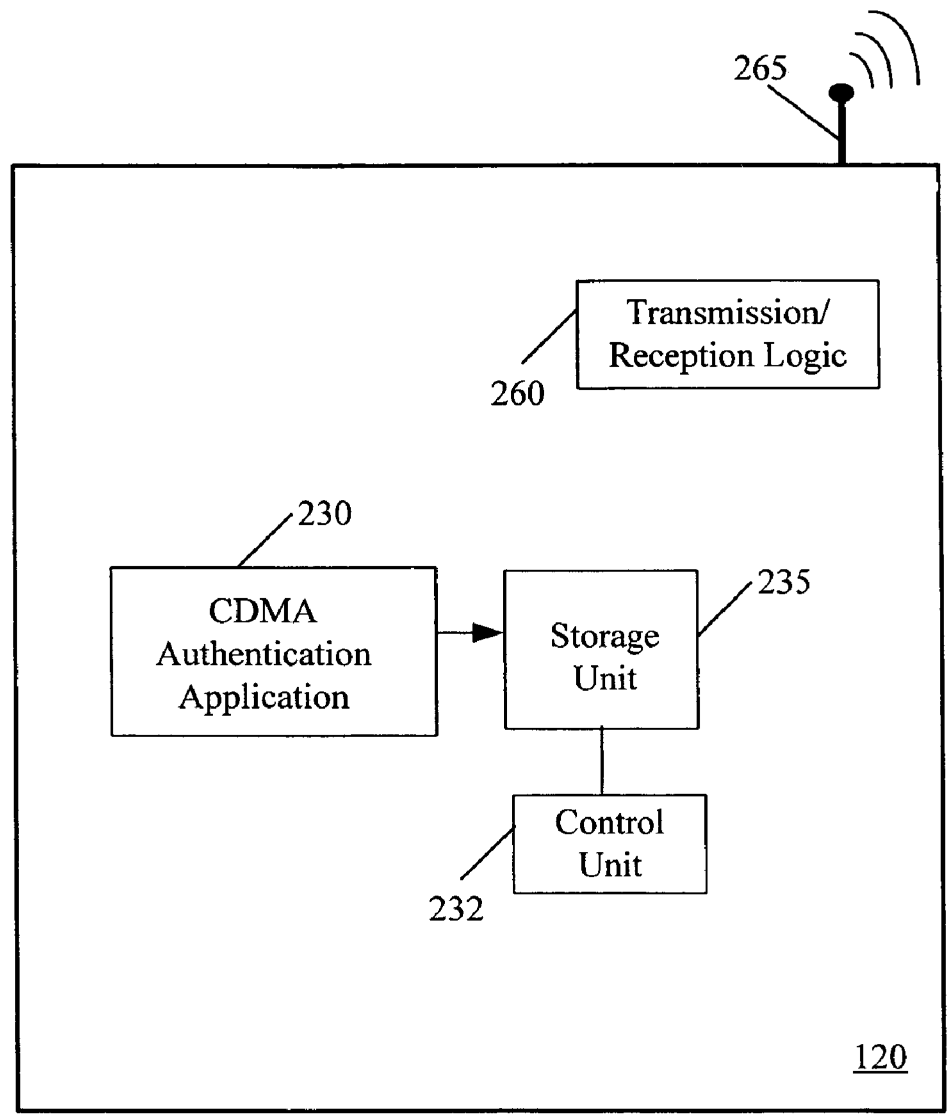
FIG. 2 is a block diagram illustration of an access terminal, in accordance with one embodiment of the present invention.

Referring now to FIG. 2, a block diagram of the access terminal 120 of FIG. 1 is illustrated, in accordance with one embodiment of the present invention. The access terminal 120 in the illustrated embodiment includes transmission/reception logic 260 and an antenna 265 for transmitting and receiving data over a wireless link with the access network 122. The access terminal 120 is generally responsible for performing the requisite acts to communicate with the access network 122, including performing the call processing functions once a session has been established. In the illustrated embodiment, the access terminal 120 includes a CDMA authentication (CA) application 230 for authenticating the mobile terminal subscription to the access network 122. In the illustrated embodiment, the CA application 230 includes a User Subscriber Identity Module (USIM), which in one embodiment takes the form of a IS41 USIM card. The access terminal 120 may include a control unit 232 that is communicatively coupled to a storage unit 235. In one embodiment, the CA application 230, if implemented in software, is storable in the storage unit 235 and executable by the control unit 232. In an alternative embodiment, the CA application 230 may be implemented in hardware or using a combination of hardware and software.

Figure 3:
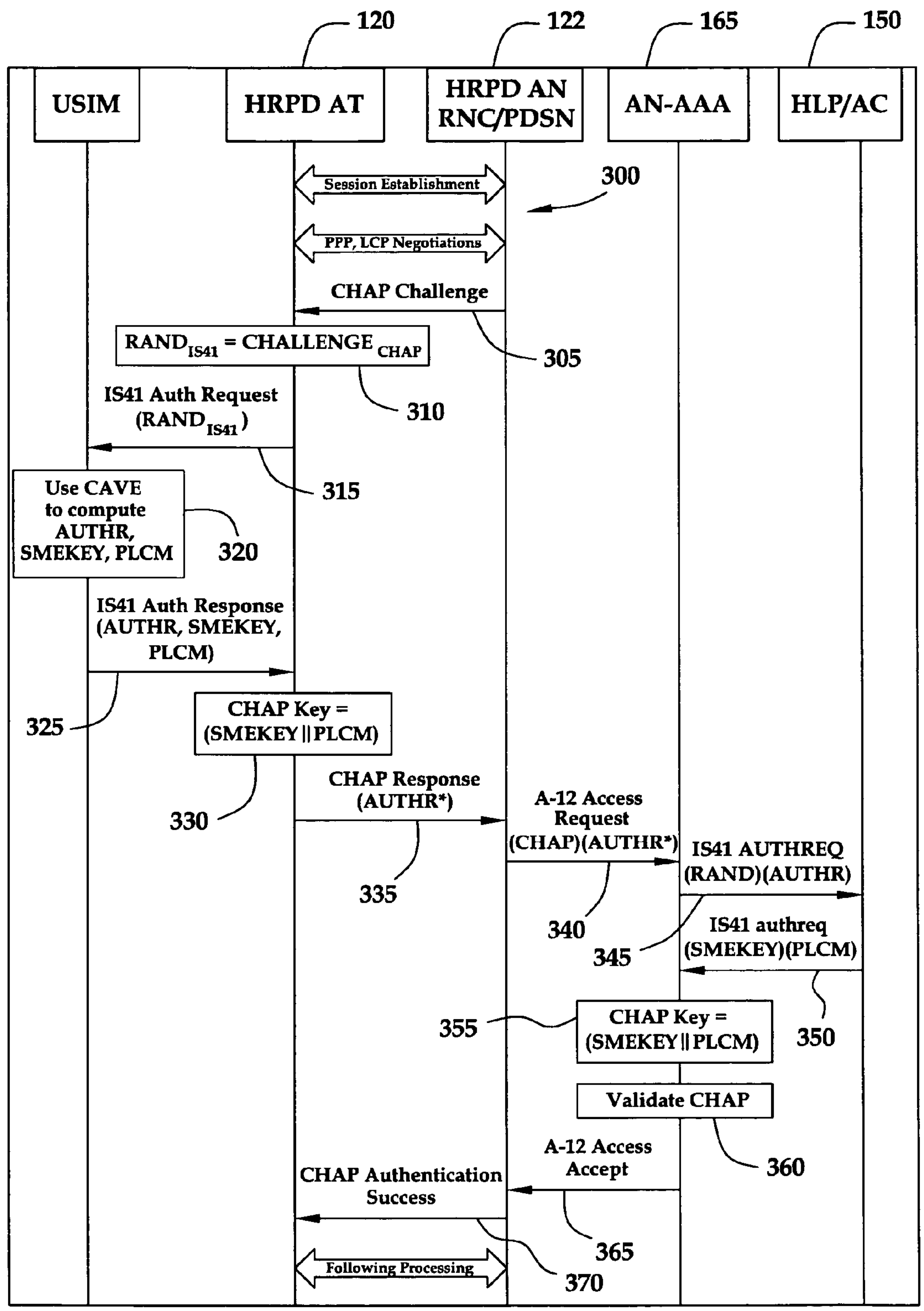
FIG. 3 depicts an exemplary message flow diagram of a procedure to authenticate a dual mode access terminal, in accordance with one embodiment of the present invention.

Referring now to FIG. 3, a procedure for authenticating the access terminal 120 regardless of the protocol that it is currently using (e.g., IS-2000 or HRPD) is illustrated, in accordance with one embodiment of the present invention. The authentication procedure commences at 300 with a communication session being established between the access terminal 120 and the access network 122. In the instant embodiment, if the protocol being used is IS-2000, then authentication occurs in a conventional manner, which is not illustrated herein to avoid unnecessarily obfuscating the instant invention. On the other hand, if the access terminal 120 initiates a communication session using the HRPD protocol, then, as described more fully below, the access terminal 120 uses substantially the same hardware/software used for an IS-2000 authentication in an HRPD authentication.

A conventional authentication protocol is used to identify the access terminal 120. In the instant embodiment, a protocol known as Challenge Handshake Authentication Protocol (CHAP) is used (CHAP is defined by the IETF RFC1994). CHAP is a conventional authentication protocol used for remote logon, usually between a client and server or Web browser and Web server. CHAP is used to verify the identity of the access terminal 120 without revealing a secret password that is shared by access terminal 120 and the access network 122. A significant concept related to CHAP is that the access terminal 120 must prove to the access network 122 that it knows a shared secret without actually revealing the secret (sending the secret access network could reveal it to an eavesdropper). CHAP provides a mechanism for doing this.

Thus, in response to the communication session being established, the access network 122 issues a conventional CHAP challenge at 305.

The access terminal 120 receives the CHAP challenge and uses it to derive a RAND challenge at 310 that may be delivered to the CDMA authentication application 230, which in the instant embodiment is the USIM card normally used to perform an IS-2000 authentication. In one embodiment of the instant invention, the RAND challenge is derived from the CHAP challenge by selecting the 32 least significant bits of the CHAP challenge to be the RAND challenge. Those skilled in the art will appreciate that the RAND challenge may be derived from the CHAP challenge using a variety of algorithms without departing from the spirit and scope of the instant invention.

At 315, the access terminal 120 forwards an authentication request that includes the derived RAND challenge to the USIM. Those skilled in the art will appreciate that the forgoing description is in the context of a call origination or a page response operation. Thereafter, at 320, the USIM executes an authentication procedure using standard CAVE based processes, to conventionally derive an 18-bit AUTHR, 64-bit SMEKEY and a 40-bit PLCM. The USIM communicates these values to the access terminal 120 in a conventional authentication response at 325.

At 330, the access terminal 120 uses information contained in the authentication response to derive a secret CHAP key. In one embodiment of the instant invention, the access terminal 120 concatenates the 64-bit SMEKEY and the 40-bit PLCM to derive the secret CHAP key. Those skilled in the art will appreciate that the secret CHAP key may be derived from the authentication response using a variety of algorithms without departing from the spirit and scope of the instant invention. The process described at 330 operates as an interface between the IS-2000 authentication and the HRPD authentication, converting the information provided by the USIM from values that would normally be associated with the IS-2000 authentication to values that may be used in the HRPD authentication.

The access terminal 120 at 335 then uses an NAI, the CHAP Challenge and the CHAP key to derive a CHAP response that is communicated to the access network 122. In one embodiment of the instant invention, the CHAP response is derived using a conventional MD5 algorithm. Additionally, the AUTHR parameter may be optionally delivered with, or as part of, the CHAP response as an additional attribute. At 340, the Access Network 122 hen assembles a conventional A-12 Access Request containing the CHAP challenge, the CHAP response, the NAI, as well as an IMSI, ESN, AUTHDATA, and AUTHR. These additional parameters may be used by the AAA server 165 in a conventional manner defined in TIA/EIA/IS-41 to construct an Authentication Request at 345. AT 350, the HLR/AC 150 receives the Authentication Request, validates AUTHR, computes the SMEKEY and PLCM, and returns the Authorization Request Return Result (along with the additional parameters) to the AAA server 165. Thereafter, at 355, the AAA server 165 assembles its version of the CHAP key based on the SMEKEY and PLCM computed by the HLR/AC 150. In one embodiment of the instant invention, the AAA server 165 derives the CHAP key by concatenating SMEKEY and PLCM, but other methods could be used as described above, as long as the method used by the Access terminal and the method used by the AAA is the same. At 360, the AAA server 165 then uses the CHAP key to validate the CHAP response delivered from the access terminal 120 at 335.

If validation is successful, the AAA server 165 sends an A-12 access accept signal to the mobility server 110 at 365, and the mobility server 110 sends an Authentication success to the access terminal 120, thereby completing the HRPD authentication process.

Figure 4:
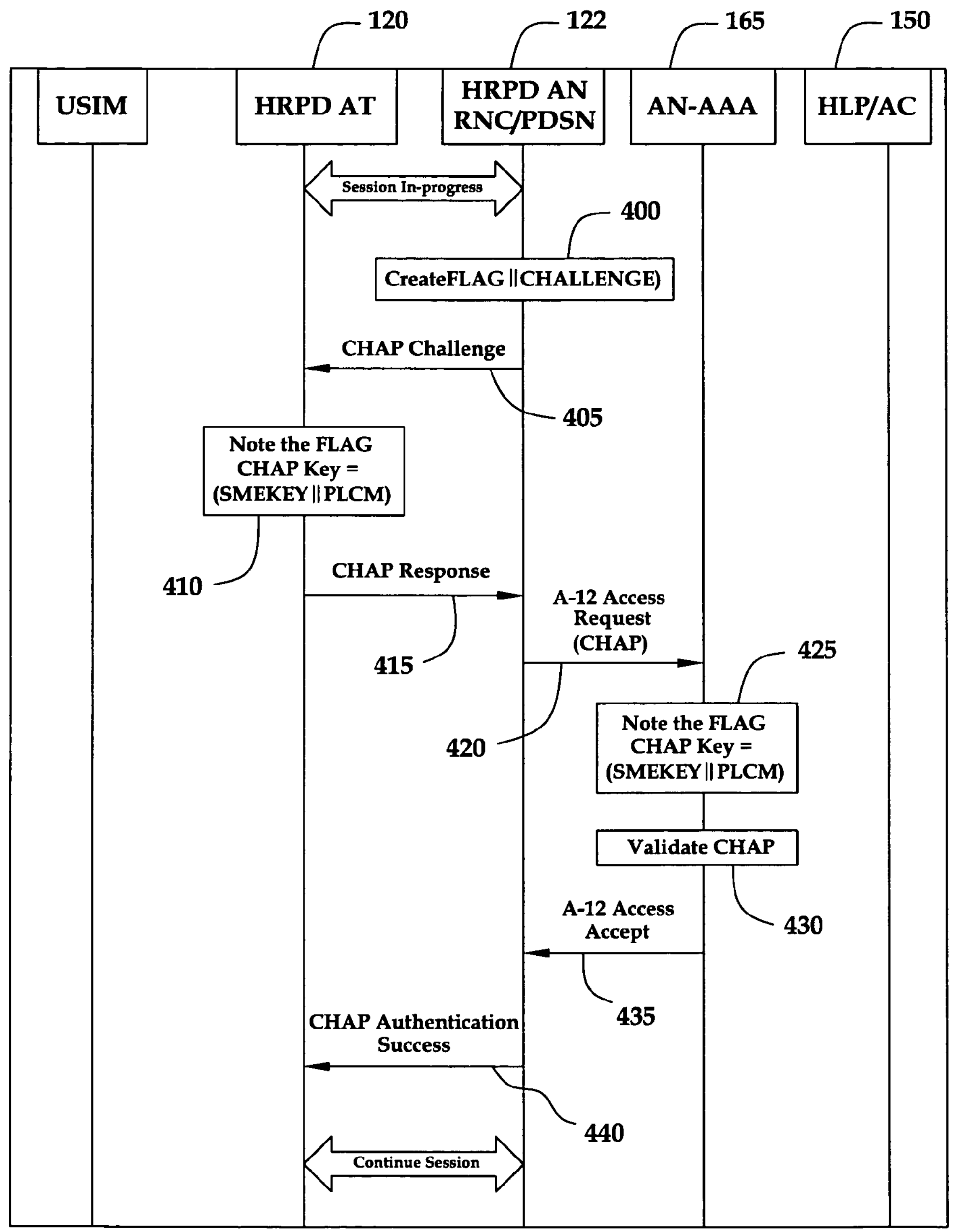
FIG. 4 depicts an exemplary message flow diagram of a procedure to reauthenticate a dual mode access terminal, in accordance with one embodiment of the present invention.

Referring now to FIG. 4, a procedure for re-authenticating the access terminal 120 is described. During a session, it may occur that the HRPD Access Network 122 elects to re -authenticate the access terminal 120. At 400, the HRPD Access Network 122 creates a new CHAP challenge that contains a unique flag indicating that this CHAP challenge is a re -authentication rather than an original authentication. At 405, the HRPD Access Network 122 sends the re-authentication CHAP challenge to the access terminal 120.

At 410, the access terminal 120 receives the CHAP challenge and identifies the re -authentication flag. The re-authentication flag signals the access terminal 120 to use the CHAP key derived earlier during the prior original authentication process (e.g., at 310 through 330 of FIG. 3). Thus, the RAND challenge is not generated and operation of the USIM is not invoked. Rather, the access terminal, at 415, issues a CHAP response that is formed from CHAP Key, which could for example be derived as SMEKEY||PLCM (determined during the original authentication), and the CHAP challenge. The HRPD Access Network 122 receives the CHAP response and uses it to form the A-12 access request and deliver it to the AAA server 165, at 420, in like manner as was done in the original authentication (e.g., 335-340).

When the AAA server 165 receives the A-12 access request at 425, it recognizes the flag as indicative of a re-authentication. Thus, the AAA server 165 does not request the HLR/AC 150 to derive a CHAP key, but rather, uses the CHAP key derived during the original authentication (e.g., 345-355). At 430, the AAA server 165 then uses the CHAP key derived HLR/AC 150 during the original authentication to validate the CHAP response delivered from the access terminal 120 at 415.

If validation is successful, the AAA server 165 sends an A-12 access accept signal to the HRPD Access Network 122 at 435, and the HRPD Access Network 122 sends an Authentication success to the access terminal 120, thereby completing the HRPD re-authentication process.

For illustrative purposes, one or more embodiments of the present invention are described in the context of a wireless communications system. However, it should be appreciated that in alternative embodiments the present invention may also be implemented in wired networks. Additionally, the present invention may also be applicable to a system supporting voice-only communications or voice and data communications.

The act of calculating or determining or deriving a value "based on" a particular value is intended to include acts that are based directly or indirectly on the use of that value. Thus, the term "based on," as utilized herein, is intended to cover any intermediate steps performed or values that are ultimately derived from the value being used.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit 232, 252, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method of authenticating a user identity module implemented in an access terminal, comprising:

receiving, at the access terminal and over an air interface, a first Challenge Handshake Authentication Protocol (CHAP) challenge associated with a first authentication process;

deriving, at the access terminal, a second challenge associated with a second authentication process based on at least a portion of the first CHAP challenge;

performing, at the user identity module, the second authentication process using the derived second challenge and producing at least one authentication parameter therefrom;

deriving, at the access terminal, a key associated with the first authentication process based on the at least one authentication parameter; and re-authenticating the access terminal using the key in response to receiving a second CHAP challenge for re-authentication of the first authentication process.

2. A method, as set forth in claim 1, wherein deriving the second challenge associated with the second authentication process based on at least a portion of the first challenge further comprises deriving a random number (RAND) challenge based on at least a portion of the first CHAP challenge.

3. A method, as set forth in claim 2, wherein deriving the RAND challenge based on at least a portion of the first CHAP challenge further comprises deriving the RAND challenge from a selected number of least significant bits in the first CHAP challenge.

4. A method, as set forth in claim 3, wherein performing the second authentication process using the derived second challenge and producing at least one authentication parameter therefrom further comprises performing a cellular authentication and voice encryption (CAVE) based authentication process on the RAND challenge to produce a short message encryption key (SMEKEY).

5. A method, as set forth in claim 4 wherein performing the CAVE based authentication process on the RAND challenge to produce SMEKEY further comprises performing the CAVE based authentication process on the RAND challenge to produce the SMEKEY and a public long code mask (PLCM).

6. A method, as set forth in claim 5, wherein deriving the key associated with the first authentication process based on the at least one authentication parameter further comprises deriving the key associated with the first authentication process based on SMEKEY and PLCM.

7. A method, as set forth in claim 1, further comprising:

generating, at the access terminal, an authentication response to the first CHAP challenge based on the key; and delivering the authentication response over the air interface to a network to request access to the network.

8. A method, as set forth in claim 7, wherein re-authenticating the access terminal comprises:

determining that the second CHAP challenge associated with the first authentication process is a re-authentication challenge;

bypassing the derivation of the second challenge associated with the second authentication process based on at least a portion of the second CHAP challenge in response to the determining that the second CHAP challenge is the re-authentication challenge;

bypassing the performance of the second authentication process using the derived second challenge and producing at least one authentication parameter therefrom in response to the determining that the second CHAP challenge is the re-authentication challenge; and wherein deriving the key associated with the first authentication process based on the at least one authentication parameter further comprises using a previously derived key in response to the determining that the second CHAP first challenge is the re-authentication challenge.

9. A method, as set forth in claim 8, further comprising:

determining that the second CHAP challenge associated with the first authentication process is a re-authentication challenge; and wherein delivering the key to a network to request access to the network further comprises delivering the previously derived key in response to the determining that the second CHAP challenge is the re-authentication challenge.

10. A method, comprising:

determining, at an access terminal, whether a Challenge Handshake Authentication Protocol (CHAP) challenge is an authentication challenge or a re-authentication challenge;

providing, from the access terminal, a response formed from a secret CHAP key derived using information retrieved from a subscriber identity module in the access terminal when the CHAP challenge is an authentication challenge; and providing, from the access terminal, a response formed from a previously derived secret CHAP key when the CHAP challenge is a re-authentication challenge.

* * * * *